United States Patent
Lee et al.

(10) Patent No.: US 11,388,124 B2
(45) Date of Patent: Jul. 12, 2022

(54) METHOD, USER DEVICE AND CONTENTS PROVISION SERVER FOR RECOMMENDING CONTENTS RELATED TO CONTENTS

(71) Applicant: KAKAO CORP., Jeju-si (KR)

(72) Inventors: Jun Lee, Seongnam-si (KR); Se Hwan Bae, Seongnam-si (KR); Ji Soo Youk, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 0 days.

(21) Appl. No.: 17/205,697

(22) Filed: Mar. 18, 2021

(65) Prior Publication Data
US 2021/0297371 A1    Sep. 23, 2021

(30) Foreign Application Priority Data
Mar. 19, 2020  (KR) ........................ 10-2020-0034025

(51) Int. Cl.
| | |
|---|---|
| *H04L 12/58* | (2006.01) |
| *G06F 16/955* | (2019.01) |
| *H04L 51/046* | (2022.01) |
| *H04L 51/10* | (2022.01) |
| *G06F 3/04842* | (2022.01) |
| *G06F 16/958* | (2019.01) |
| *G06F 3/04883* | (2022.01) |

(52) U.S. Cl.
CPC ........ *H04L 51/046* (2013.01); *G06F 3/04842* (2013.01); *G06F 3/04883* (2013.01); *G06F 16/958* (2019.01); *G06F 16/9558* (2019.01); *H04L 51/10* (2013.01)

(58) Field of Classification Search
CPC ....... H04L 51/046; H04L 51/04; H04L 51/10; G06F 16/958; G06F 16/9558; G06F 16/955; G06F 3/04842; G06F 3/04883
USPC ....................................................... 709/206
See application file for complete search history.

(56) References Cited

U.S. PATENT DOCUMENTS

| | | | |
|---|---|---|---|
| 10,430,483 B2* | 10/2019 | O'Driscoll | .......... G06F 16/9535 |
| 2009/0106416 A1* | 4/2009 | Cohen | ................. G06Q 10/109 |
| | | | 709/224 |

(Continued)

FOREIGN PATENT DOCUMENTS

| | | | |
|---|---|---|---|
| CN | 109492152 A | * | 3/2019 |
| CN | 110866179 A | * | 3/2020 |

(Continued)

*Primary Examiner* — Ruolei Zong
(74) *Attorney, Agent, or Firm* — Hamre, Schumann, Mueller & Larson, P.C.

(57) ABSTRACT

A method is performed by a user device. The method includes participating in a chatroom created through an instant messaging application managed by a messaging management server, displaying, on the chatroom, an instant message including information related to a content input from another user device participating in the chatroom, receiving an action of interest in the related information of the displayed instant message, displaying the content corresponding to the related information in which the action of interest has been received, returning to the chatroom from the displayed content, and displaying, on the chatroom, at least one recommended content related to the content.

17 Claims, 11 Drawing Sheets

(56) References Cited

U.S. PATENT DOCUMENTS

| | | | | |
|---|---|---|---|---|
| 2012/0042263 A1* | 2/2012 | Rapaport | ............... | G06Q 50/01 |
| | | | | 715/753 |
| 2015/0294358 A1* | 10/2015 | Galadari | ............ | G06Q 30/0257 |
| | | | | 705/14.55 |
| 2016/0330150 A1* | 11/2016 | Joe | ......................... | G06F 16/951 |
| 2019/0058770 A1* | 2/2019 | Galai | ................... | H04N 21/466 |

FOREIGN PATENT DOCUMENTS

| | | | | |
|---|---|---|---|---|
| KR | 10-2010-0063838 A | 6/2010 | | |
| KR | 10-2016-0126790 A | 11/2016 | | |
| KR | 10-2017-0045841 A | 4/2017 | | |
| WO | WO-2018018610 A1 * | 2/2018 | ............. | G06F 16/00 |
| WO | WO-2020000207 A1 * | 1/2020 | ............. | G06F 17/40 |

* cited by examiner

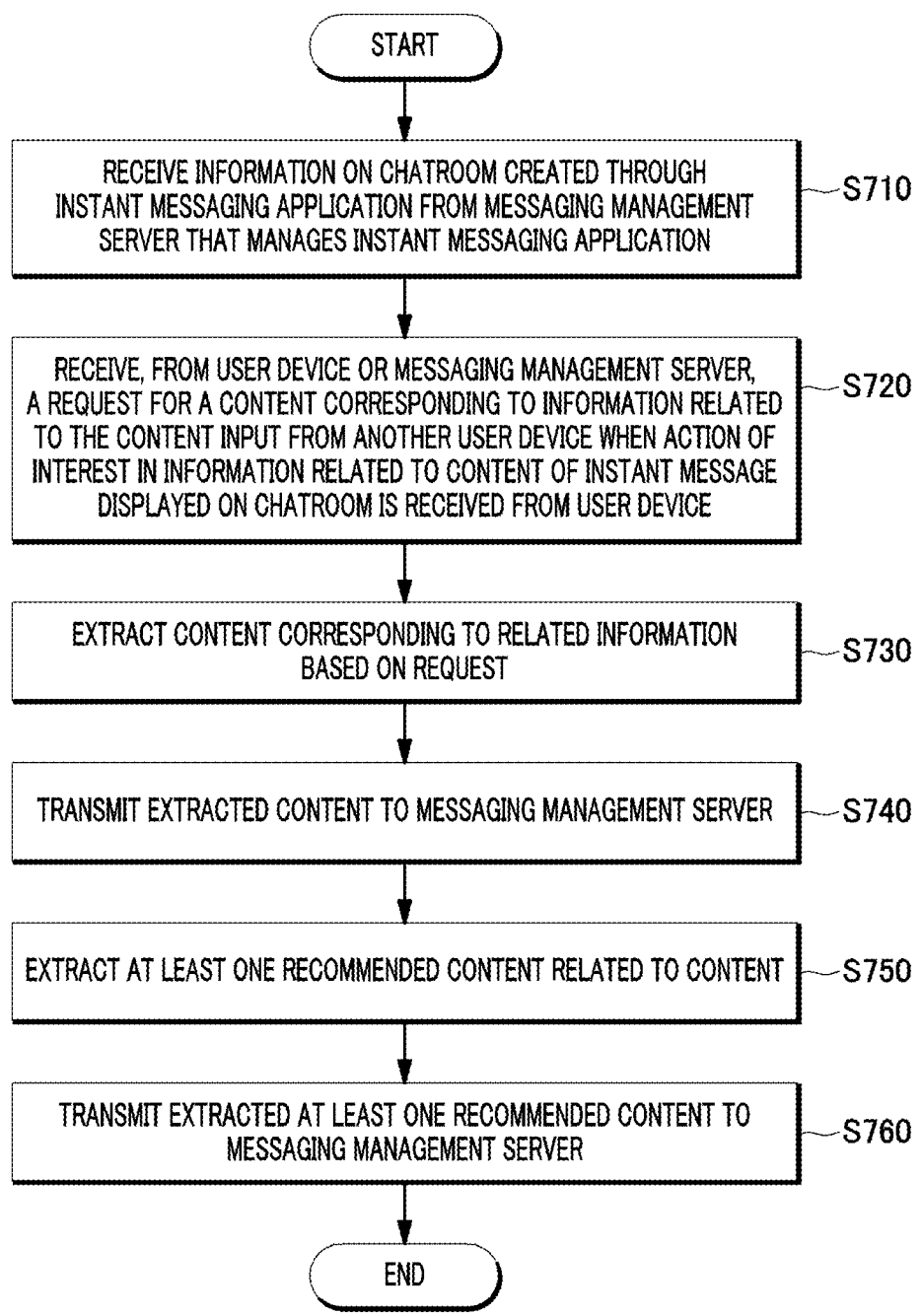

METHOD, USER DEVICE AND CONTENTS PROVISION SERVER FOR RECOMMENDING CONTENTS RELATED TO CONTENTS

CROSS-REFERENCE TO RELATED APPLICATION

This application claims the benefit under 35 USC 119(a) of Korean Patent Application No. 10-2020-0034025 filed on 19 Mar. 2020, in the Korean Intellectual Property Office, the entire disclosures of which are incorporated herein by reference for all purposes.

TECHNICAL FIELD

The present disclosure relates to a method, user device and content providing server for providing recommended content related to content.

BACKGROUND

IMS (Instant Message Service) refers to a real-time online communication service that enables a message transmitted from a sender to instantly appear on the screen of a device of a receiver without using an e-mail program or a web browser. In particular, a service for providing chatting and voice and video calls through a mobile network is referred to as MIM (Mobile Instant Messenger) service.

With the development of smart devices, it is possible for a user to use various content, such as read blogs, listen to music and watch videos, in various places without being limited to the location of the user. Also, the user can share content with another user.

In this case, in order for the user to share content with another user through the IMS, a URL of a site where corresponding content is located needs to be input. The other user can use the shared content by accessing the URL of the site where the corresponding content is located through the IMS.

However, if the other user is interested in the content shared through the IMS, he/she needs to inconveniently exit from the IMS and perform search for related content through another search site.

PRIOR ART DOCUMENT

Korean Patent Laid-open Publication No. 2010-0063838 (published on Jun. 14, 2010)

SUMMARY

In view of the foregoing, the present disclosure provides a method, user device and content providing server for providing recommended content related to content by which a user device participates in a chatroom created through an instant messaging application managed by a messaging management server, an instant message including information related to content input from another user device is displayed through the chatroom, an action of interest in the related information of the displayed instant message is received, and content corresponding to the related information is displayed.

The present disclosure provides a method, user device and content providing server for displaying, on the chatroom, recommended content related to content when the user device returns to the chatroom from the displayed content.

However, the problems to be solved by the present disclosure are not limited to the above-described problems. There may be other problems to be solved by the present disclosure.

According to at least one example embodiment, a method performed by a user device, may include participating in a chatroom created through an instant messaging application managed by a messaging management server; displaying, on the chatroom, an instant message including information related to a content input from another user device participating in the chatroom; receiving an action of interest in the related information of the displayed instant message; displaying the content corresponding to the related information in which the action of interest has been received; returning to the chatroom from the displayed content; and displaying, on the chatroom, at least one recommended content related to the content.

According to at least one other example embodiment, a user device may include a participation unit configured to participate in a chatroom created through an instant messaging application managed by a messaging management server; a receiving unit configured to receive, from the messaging management server, an instant message including information related to a content input from another user device participating in the chatroom; a display unit configured to display the instant message received through the chatroom; and an input unit configured to receive an action of interest in the related information of the displayed instant message, wherein the receiving unit is further configured to receive, from a content providing server, the content corresponding to the related information in which the action of interests has been received, the display unit is further configured to display the received content, the receiving unit is further configured to receive at least one recommended content related to the content from the content providing server, and when the user device returns to the chatroom from the displayed content, the display unit is further configured to display, on the chatroom, the at least one recommended content related to the content.

According to at least one other example embodiment, a content providing server may include a chatroom information receiving unit configured to receive information on a chatroom created through an instant messaging application from a messaging management server that manages the instant messaging application; a request receiving unit configured to receive, from the messaging management server, a request for a content corresponding to information related to the content input from another user device when an instant message including the related information is displayed through the chatroom and an action of interest in the related information of the displayed instant message is received from a user device; an extracting unit configured to extract the content corresponding to the related information based on the request; and a transmission unit configured to transmit the extracted content to the messaging management server, wherein the extracting unit is further configured to extract at least one recommended content related to the content, and the transmission unit is further configured to transmit the extracted at least one recommended content to the messaging management server.

This summary is provided by way of illustration only and should not be construed as limiting in any manner. Besides the above-described exemplary embodiments, there may be additional exemplary embodiments that become apparent by reference to the drawings and the detailed description that follows.

According to any one of the embodiments described above, it is possible to provide a method, a user device and a content providing server by which if a user device inputs an action of interest in information related to content received from another user device, it is determined that a user is interested in the content based on the input action of interest and content, which the user might be interested in, is recommended.

It is possible to provide a method, a user device and a content providing server by which if a user device displays content corresponding to related information in which an action of interest has been received and returns to a chatroom from the displayed content, recommended content related to the content is provided in the chatroom.

It is possible to provide a method, a user device and a content providing server by which whenever an action of interest in related information is input, recommended content is refreshed and displayed to provide different recommend content for the same related information.

It is possible to provide a method, a user device and a content providing server by which a user device receives at least one recommended content related to content, selects any one of the at least one recommended content item by a swipe input and receives information about the recommended content.

It is possible to provide a method, a user device and a content providing server by which recommended content based on attributes and metadata of content is provided and the recommended content is provided in further consideration of previous conversations between a user device and another user device and specific data.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7 is a flowchart of a method for providing recommended content related to content in a content providing server in accordance with various embodiments described herein.

DETAILED DESCRIPTION

Figure 1:
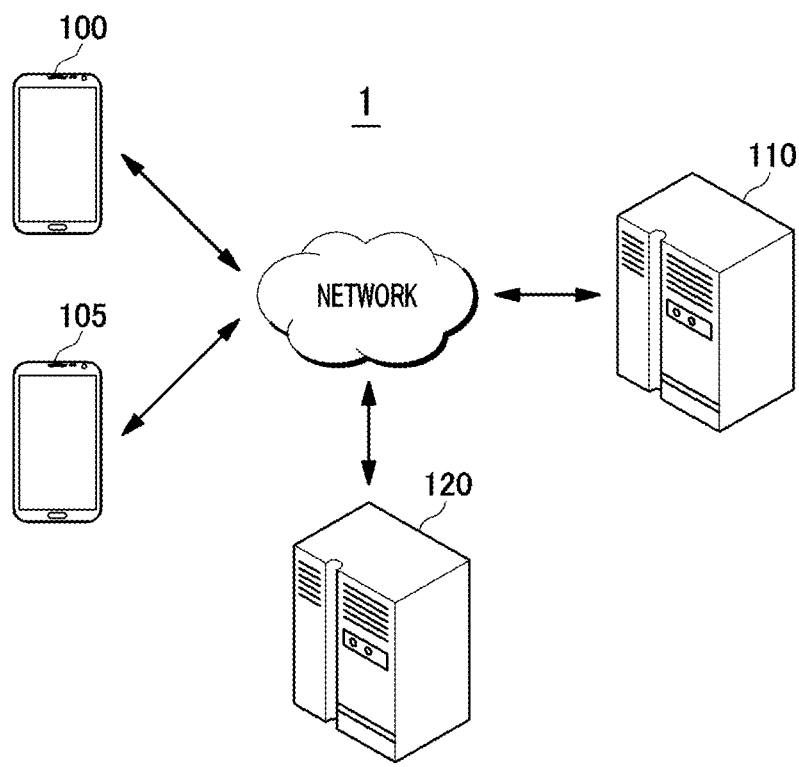
FIG. 1 is a configuration diagram of a recommended content providing system in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

FIG. 1 is a configuration diagram of a recommended content providing system in accordance with various embodiments described herein. Referring to FIG. 1, a recommended content providing system 1 may include a user device 100, a messaging management server 110 and a content providing server 120. The user device 100, the messaging management server 110 and the content providing server 120 are illustrated as example components which can be controlled by the recommended content providing system 1. The recommended content providing system 1 illustrated in FIG. 1 is just an embodiment of the present disclosure and should not be construed as liming the present disclosure and can be configured differently from that shown in FIG. 1 according to various embodiments of the present disclosure.

The components of the content providing system 1 illustrated in FIG. 1 are typically connected to each other via a network. For example, as illustrated in FIG. 1, the messaging management server 110 may be connected to the user device 100 or the content providing server 120 simultaneously or sequentially.

The network refers to a connection structure that enables information exchange between nodes such as devices and servers, and includes LAN (Local Area Network), WAN (Wide Area Network), Internet (WWW: World Wide Web), a wired or wireless data communication network, a telecommunication network, a wired or wireless television network and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi and the like, but may not be limited thereto.

The user device 100 may be provided with a chat service from the messaging management server 110 through a chatroom. The user device 100 may have a conversation by sending and receiving instant messages including texts, images, emoticons, etc. through a chatroom created through an instant messaging application managed by the messaging management server 110.

For example, the user device 100 may have a conversation with another user device 105 through a one-to-one chatroom in which the user device 100 and another user device 105 are participating.

As another example, the user device 100 may have a conversation with a plurality of other user devices through a group chatroom in which the user device 100 and the plurality of other user devices. As yet another example, the user device 100 may receive a notification message provided by a chatbot through a chatroom in which the chatbot is added as a virtual friend through the instant messaging application.

The user device 100 may receive, from the messaging management server 110, an instant message, which is including information related to a content, input from another user device 105 participating in the chatroom and display the instant message received through the chatroom. Here, the information related to the content may include information that defines the content or explains the origin of the content and address information of the content, specifically, link information of the content. For example, the user device 100 may display at least one of link information or summary information matched with the link information. In this case, the summary information may include a thumbnail image or text information matched with the link information, or metadata related to the content which can be collected from the link information.

The user device 100 may receive an action of interest in the related information included in the instant message displayed on the screen through the chatroom. Here, the action of interest may include a touch input or a click input for the related information. For example, the user device 100 may receive a touch input for the link information.

The user device 100 may receive, from the content providing server 120, the content corresponding to the related information in which the actin of interest has been received and display the received content. To this end, the user device 100 may access a web page corresponding to the link information for which the touch input has been received. For example, the user device 100 may request, from the content providing server 120, access to the web page corresponding to the link information for which the touch input has been received, receive, from the content providing server 120, content corresponding to the web page which the user device 100 has accessed, and display the content corresponding to the web page which the user device 100 has accessed through a page view of the instant messaging application, a browser, or a third application. Here, when an external output (an output other than the chatroom displayed through the instant messaging application) that displays the content corresponding to the related information is activated, the chatroom in an activated state may be put into an inactivated state. Here, the inactivated state of the chatroom may include a state where the external output is overlaid on the chatroom, and, thus, the chatroom cannot be seen, a state where a user input (for example, a fingerprint input or a password input) is needed to reactivate the chatroom, and the like.

Then, the user device 100 may close the page view, the browser or the third application and return to the chatroom. Here, when the user device 100 returns to the chatroom, the activated external output is put into the inactivated state and the chatroom is reactivated.

When the user device 100 closes the displayed content and returns to the chatroom, the user device 100 may receive recommended content related to the content from the content providing server 120 and display the recommended content related to the content on the chatroom.

For example, the recommended content refers to specific content that is determined as being related to the content in which the user shows interest, and may include at least one of a content related to attributes of the related information, a content recommended based on substance or metadata of the related information, a content recommended based on a message displayed on the chatroom before or after the instant message including the related information is received, and a content recommended based on data stored in the instant messaging application or the messaging management server 110.

That is, according to the present disclosure, when the user's interest caused by "information related to content" is recognized, it is determined that the user is interested in the content and recommended content related to the content can be provided.

Also, according to the present disclosure, recommended content can be provided for the user's interest caused by "information related to content" as well as the user's interest caused by "content" itself.

Specifically, the user device 100 may be provided with a content providing service through the chatroom. For example, another user device 105 may share content (for example, blogs, images, videos, search results, etc.) through the chatroom and the user device 100 may be provided with the shared content through the chatroom.

As another example, the user device 100 may receive an input of a keyword through the chatroom, request a content related to the input keyword from the content providing server 120 through the messaging management server 110, and receive the content extracted from the content providing server 120 through the messaging management server 110.

The user device 100 may be provided with a recommended content service related to the content from the content providing server 120 through the chatroom.

For example, if the user device 100 receives shared content input from another user device 105 through the chatroom, the chatroom in which the user device 100 participates may be activated. The user of the user device 100 may select the shared content. Here, the selection of the content by the user may be recognized as a kind of behavior of interest (or action of interest) on the basis of which it is determined that the user is interested in the content. The user device 100 can check the selected content through the page view, the browser or the third application. Meanwhile, if the content is output through the page view, the browser or the third application, the chatroom in which the user device 100 participates may be inactivated. Then, if the user device 100 closes the page view, the browser or the third application, the user device 100 may return to the chatroom to have a conversation with another user device 105.

That is, if the user device 100 satisfies a series of predetermined scenarios in which the user device 100 starts from the chatroom, which is a starting point, to an external page (different in location from the chatroom) where a content in which an action of interest has been recognized is output and returns to the chatroom, which is the starting point, after the external page is closed, the user device 100 may receive recommended content related to the content in which the action of interest has been recognized from the content providing server 120 through the messaging management server 110.

As another example, if the user device 100 receives a notification message (for example, new menu notification) provided from a virtual friend through a chatroom, the chatroom in which the virtual friend and the user device 100 are participating can be activated. The user of the user device 100 may select the provided notification message. Here, the selection of the notification message by the user may be recognized as a kind of behavior of interest on the basis of which it is determined that the user is interested in the notification message. The user device 100 can check related content (for example, new menu detailed information) through the selected notification message through the page view, the browser or the third application. Here, since the user device 100 can check the content through the page view, the browser or the third application, the user device 100 may exit from the chatroom, and, thus, the chatroom may be inactivated and an external output displaying the content may be activated. Then, the user device 100 may complete checking of the content and return to the chatroom. Here, when the checking of the content is completed, the external output may be inactivated and the chatroom to which the user device 100 has returned back may be reactivated.

That is, if the user device 100 satisfies a series of predetermined scenarios in which the user device 100 starts from the chatroom, which is a starting point, to an external page (different in location from the chatroom) where content in which an action of interest has been recognized is output and returns to the chatroom, which is the starting point, after the external page is closed, the user device 100 may receive recommended content (popular menu information) related to the content (new menu detailed information) from the content providing server 120 through the messaging management server 110.

The user device 100 may participate in a chatroom created through the instant messaging application managed by the messaging management server 110. Here, when the user device 100 participates in the chatroom, the chatroom may be activated.

The user device 100 may receive at least one recommended content related to a content from the content providing server 120 through the messaging management server 110 and display the at least one recommended content on the chatroom to which the user device 100 has returned back. Here, the user device 100 may display each recommended content by using summary information matched with link information related to an external source for each of the at least one recommended content. For example, the user device 100 may display each recommended content using a thumbnail image matched with link information related to an external source for each of the at least one recommended content.

The user device 100 may receive a selection for any one of the at least one displayed recommended content and access a web page corresponding to the selected recommended content.

The user device 100 may receive again an action of interest in "content" or "information related to content" and refresh recommended content related to the content based on the "content" or "information related to content" in which the action of interest has been received again. For example, the term "refresh" may refer to a refresh operation to update information about specific content. Whenever the user device 100 receives again an action of interest in recommended content output on the screen, the user device 100 may refresh the recommended content output on the screen to update information about the recommended content.

The messaging management server 110 may receive, from the user device 100, a request for content selected by the user device 100 and request the content from the content providing server 120. When the content is extracted from the content providing server 120, the messaging management server 110 may receive and transfer the extracted content to the user device 100.

When the user device 100 checks the content, closes the displayed content and then returns to the chatroom with another user device 105, the messaging management server 110 may receive information about a return event to the chatroom from the user device 100 and transmit the return event information to the content providing server 120. The messaging management server 110 may receive, from the content providing server 120, recommended content related to the extracted content based on the return event information and transmit the received recommended content to the user device 100.

When the messaging management server 110 receives the content from the content providing server 120, the messaging management server 110 may also receive recommended content related to the content. Thus, the messaging management server 110 may also transfer the content together with the recommended content to the user device 100.

Here, when the user device 100 checks the content and then returns to the chatroom with another user device 105, the user device 100 may output recommended content previously received from the messaging management server 110. That is, when the messaging management server 110 transfers the content from the content providing server 120 to the user device 100, recommended content is also provided. Thus, even if the messaging management server 110 does not receive information about a return event to the chatroom from the user device 100, the recommended content can be provided to the user of the user device 100.

The messaging management server 110 may relay the user device 100 and the content providing server 120 so that the content and the recommended content can be provided from the content providing server 120 to the user device 100.

That is, while the user device 100 starts from the chatroom, which is a starting point, with another user device 105 to an external page where the content in which an action of interest has been recognized is output and returns to the chatroom, which is the starting point, with another user device 105, the messaging management server 110 may allow recommended content to be provided to the chatroom.

When the user device 100 and another user device 105 participate in a chatroom created through the instant messaging application managed by the messaging management server 110, the messaging management server 110 may transmit instant messages sent and received between the user device 100 and another user device 105 participating in the chatroom. For example, the messaging management server 110 may transmit, to the user device 100, an instant message, which is input from another user device 105 participating in the chatroom, including information related to content.

When the user device 100 receives an action of interest in the related information of the instant message displayed on the chatroom, the messaging management server 110 may request content corresponding to the related information from the content providing server 120.

The messaging management server 110 may transmit, to the user device 100, the content corresponding to the related information and extracted by the content providing server 120.

Then, when the user device 100 closes the content displayed on the user device 100 and returns to the chatroom with another user device 105, the messaging management server 110 may transmit information about a return event to the chatroom to the content providing server 120.

The messaging management server 110 may receive, from the content providing server 120, recommended content related to the content based on the return event information and transmit the received recommended content to the user device 100.

Further, the messaging management server 110 may provide recommended content extracted by a chatbot to the user device 100. For example, if the user device 100 registers a chatbot corresponding to an official partner as a virtual friend, the messaging management server 110 may create a chatroom to receive a notification message from the chatbot and transmit a notification message generated by the chatbot to the user device 100.

When the user device 100 selects the notification message, the messaging management server 110 may transmit content related to the notification message to the content providing server 120 and transmit content extracted by the content providing server 120 to the user device 100. Here, the selection of the notification message by the user device 100 may be recognized as a kind of action of interest on the basis of which it is determined that the user is interested in the content related to the notification message.

When the user device 100 checks the content related to the notification message and then returns to the chatroom, the messaging management server 110 may receive information about a return event to the chatroom from the user device 100 and transmit the return event information to the content providing server 120.

The messaging management server 110 may receive, from the content providing server 120, recommended content extracted based on the information about the return event of the user device 100 to the chatroom and transmit the received recommended content to the user device 100.

Further, the messaging management server 110 provides recommended content when content is transferred from the content providing server 120 to the user device 100. Thus, even if the messaging management server 110 does not receive information about a return event to the chatroom from the user device 100, the recommended content can be provided to the user of the user device 100.

That is, while the user device 100 starts from the chatroom, which is a starting point, with the chatbot to an external page (different in location from the chatroom) where the content in which an action of interest has been recognized is output and returns to the chatroom, which is the starting point, with the chatbot, the messaging management server 110 may allow recommended content to be provided to the chatroom.

In this way, the messaging management server 110 can also provide the content and recommended content, which are provided through an account linked to a virtual friend, to the user device 100 through the chatroom with the chatbot.

The content providing server 120 may provide the content providing service to the user device 100.

For example, if the user device 100 selects a content shared through the chatroom in which the user device 100 participates, the content providing server 120 may extract the selected content and provide the content to the user device 100 through the messaging management server 110. Here, the selection of the content shared through the chatroom may be a kind of action of interest on the basis of which it is determined that the user is interested in the content.

The content providing server 120 may provide recommended content related to the content to the user device 100 through the messaging management server 110. For example, when the user device 100 checks the content and then returns to the chatroom, the content providing server 120 may receive information about a return event to the chatroom from the messaging management server 110. Here, if the user device 100 satisfies a predetermined recommended content providing scenario in which the user device 100 starts from the chatroom, which is a starting point, to an external page (different in location from the chatroom) where the content in which an action of interest has been recognized is output and returns to the chatroom, which is the starting point, the content providing server 120 may extract recommended content related to the content based on the return event information and provide the extracted recommended content to the user device 100 through the messaging management server 110.

The content providing server 120 includes a search service providing server, a media content providing server, a web server and the like, but is not limited thereto.

The content providing server 120 may receive information about a chatroom created through the instant messaging application from the messaging management server 110 that manages the instant messaging application. For example, the information about the chatroom may include at least one of user accounts of the user device 100 and another user device 105, respectively, a chatroom identifier of the instant messaging application or a chat history accumulated with conversations between the users in the chatroom.

When an instant message, which is input from another user device 105, including information related to content is displayed through the chatroom and an action of interest in the related information of the displayed instant message is received from the user device 100, the content providing server 120 may receive a request for the content corresponding to the related information from the messaging management server 110.

The content providing server 120 may transmit the extracted content to the messaging management server 110.

For example, when the user device 100 accesses a web page corresponding to link information for which a touch input has been received, the content providing server 120 may transmit content corresponding to the web page to the user device 100.

The content providing server 120 may extract the content corresponding to the related information based on the request. For example, the content providing server 120 may extract recommended content including at least one of content related to attributes of the related information, content recommended based on substance or metadata of the related information, content recommended based on a message displayed in the chatroom before or after the instant message including the related information is received, and content recommended based on data stored in the instant messaging application or the messaging management server 110.

When the user device 100 returns to the chatroom from the content displayed on the user device 100, the content providing server 120 may receive information about a return event from the messaging management server 110.

When the action of interest in the related information is received again from the user device 100, the content providing server 120 may re-extract recommended content related to the content based on the related information in which the action of interest has been received again and transmit the re-extracted recommended content to the messaging management server 110.

Figure 2:
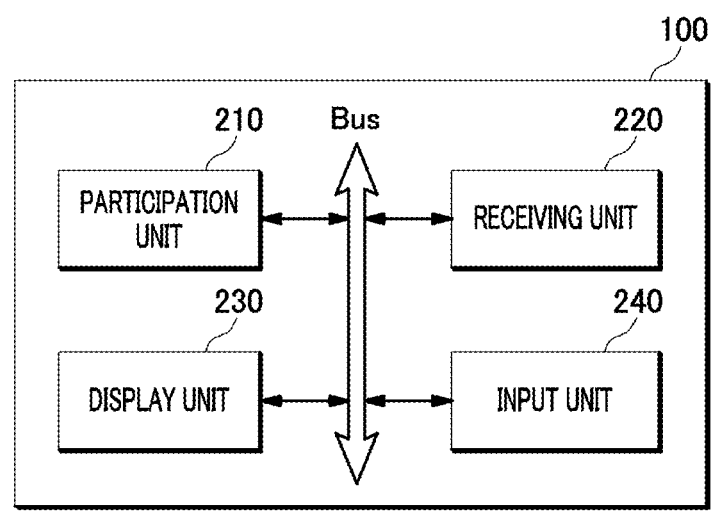
FIG. 2 is a configuration diagram of a user device in accordance with various embodiments described herein.

FIG. 2 is a configuration diagram of a user device in accordance with various embodiments described herein. Referring to FIG. 2, the user device 100 may include a participation unit 210, a receiving unit 220, a display unit 230 and an input unit 240.

The participation unit 210 may participate in a chatroom created through the instant messaging application managed by the messaging management server 110. For example, the participation unit 210 may participate in the chatroom created through the instant messaging application to perform a chat with another user device 105.

Here, the chatroom may be activated when the user device 100 participates in the chatroom.

The receiving unit 220 may receive, from the messaging management server 110, an instant message, which is input from another user device 105 participating in the chatroom, including information related to content. Here, the information related to the content may include information that defines the content or explains the origin of the content and address information of the content, specifically, link information of the content.

The display unit 230 may display the instant message received through the chatroom. For example, the display unit 230 may display at least one of link information or summary information matched with the link information based on the information related to the content input from another user device 105.

Here, by displaying the instant message including the summary information matched with the link information on the chatroom, only indirect information about the content (for example, the title of the content, a representative image of the content, etc.) can be displayed like a preview.

The input unit 240 may receive an action of interest in the related information of the displayed instant message. Here, the action of interest refers to an input which can be received when the user is interested in a specific content and may include a touch input or a click input. Here, the action of interest may request information corresponding to the link information from the content providing server 120.

The receiving unit 220 may receive, from the content providing server 120, the content corresponding to the related information in which the action of interests has been received. Here, the receiving unit 220 may receive, from the content providing server 120, content corresponding to a web page which the user device 100 has accessed.

For example, the receiving unit 220 may receive the content corresponding to the related information from the content providing server 120 by access to a web page corresponding to link information for which a touch input has been received.

The display unit 230 may display the received content. For example, the display unit 230 may display content corresponding to a web page which the user device 100 has accessed through the page view of the instant messaging application, the browser or the third application. As another example, the display unit 230 may display the content corresponding to a web page which the user device 100 has accessed through a separate browser. Here, when the display unit 230 displays the content received through the page view, the browser or the third application, the display unit 230 can display direct information about the content (detailed information related to the content).

Here, the user device 100 may exit from the chatroom, which is a starting point, and move to an external location, and, thus, the chatroom activated in the instant messaging application is put into the inactivated state and an external output displaying the content may be activated.

The receiving unit 220 may receive recommended content related to the content from the content providing server 120. For example, when the user device 100 closes the page view and returns to the chatroom, the receiving unit 220 may receive recommended content related to the content from the content providing server 120.

When the user device 100 returns to the chatroom from the displayed content, the display unit 230 may display the recommended content related to the content in the form of a bubble through the chatroom. When the user device 100 returns to the chatroom from the content, event information is generated according to a predetermined recommendation scenario and the generated event information may be transmitted to the messaging management server 110.

Here, when the user device 100 returns to the chatroom from the content, the user device 100 returns to the starting point, and, thus, the chatroom may be reactivated.

The recommended content may include, for example, at least one of content related to attributes of the related information, content recommended based on substance or metadata of the related information, content recommended based on a message displayed on the chatroom before or after the instant message including the related information is received, and content recommended based on data stored in the instant messaging application or the messaging management server 110. Here, the data stored in the instant messaging application or the messaging management server 110 may include, for example, a calendar or memos linked to the instant messaging application, photos, videos, files or links sent and received through the instant messaging application, or data stored in the user account.

The display unit 230 may display each recommended content in a form of a slide by using summary information matched with link information related to an external source for each of the at least one recommended content. Here, the recommended content displayed on the chatroom may be separately stored or bookmarked by the user device 100.

That is, according to the present disclosure, the user's interest is analyzed in depth based the user's action of interest to provide recommended content related to content in which the action of interest has been received.

For example, if a plurality of content input from another user device 105 is shared through the chatroom between the user device 100 and another user device 105 and instant messages including the shared content items are sequentially displayed on the chatroom of the user device 100, the user device 100 may feel fatigue feeling due to the sequentially displayed instant messages and thus may not check the plurality of shared content items.

If the user device 100 selects any one of the plurality of shared content, the selection of the content by the user may be an action of interest in which the level of the user's interest in the content has been reflected.

That is, according to the present disclosure, the user's action of interest generated in the chatroom is analyzed in depth to recommend another content, which the user might be interested in, based on content in which the action of interest has been reflected. Accordingly, the present disclosure has the advantage of omitting a separate search process, as compared to a conventional technology in which when the user checks content shared through the chatroom, if the user is interested in the content, the user performs a separate search through a search site.

For example, if the user device 100 is having a conversation with another user device 105 in the chatroom, the user device 100 satisfies a condition that the user device 100 is located in the chatroom which is a starting point. Thus, it can be determined that a first process in a predetermined recommend content providing scenario is satisfied.

Then, if the user device 100 selects content input from another user device 105 and thus moves to the content located outside the chatroom through an external output and checks the content, the user device 100 satisfies a condition that the user device 100 exits from the chatroom, which is a starting point, and moves to an external location. Thus, it can be determined that a second process in the predetermined recommend content providing scenario is satisfied.

Thereafter, if the user device 100 completes checking of the content and returns to the chatroom in which the user device 100 is having a conversation with another user device 105, the user device 100 satisfies a condition that the user device 100 is located in the chatroom which is a starting point. Thus, it can be determined that a third process in the predetermined recommend content providing scenario is satisfied.

If a series of the user's actions related to the chatroom satisfies the predetermined recommend content providing scenario in this way, recommend content related to the content can be provided to the user device 100. Thus, the user device 100 may also provide the recommended content to another user device 105 that shares the content with common interests. Further, an additional conversation with another user device 105 can be made based on the recommended content shared by the user device 100.

The input unit 240 may receive an input of selection of any one of the at least one recommended content displayed by the display unit 230. For example, if any one of the at least one recommended content displayed in the form of a slide is selected by a swipe input, the user device 100 may access a web page corresponding to the selected recommended content.

The input unit 240 may receive again an action of interest in the related information and refresh the recommend content related to the content based on the related information in which the action of interest has been received again.

The display unit 230 may display the refreshed recommend content related to the content. For example, when the input unit 240 receives again an action of interest in the same related information, the display unit 230 may display recommended content different from the previously displayed recommended content related to the content based on the related information in which the action of interest has been received again.

FIG. 3A to FIG. 3D are example diagrams provided to explain a process for providing recommended content related to content on a specific topic in a user device in accordance with various embodiments described herein.

Figure 3A:
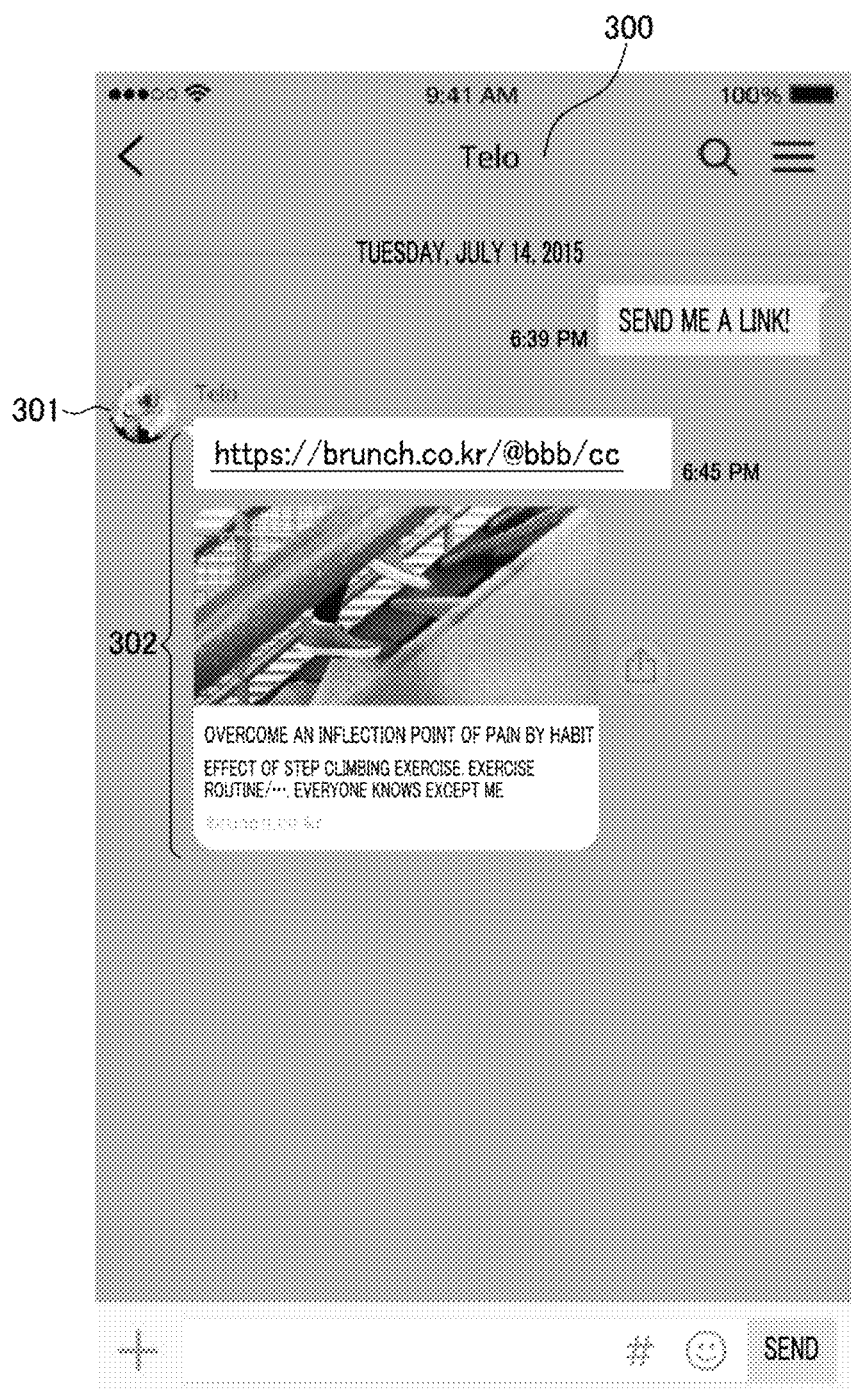
FIG. 3A is example diagram provided to explain a process for providing recommended content related to content on a specific topic in a user device in accordance with various embodiments described herein.

Referring to FIG. 3A, the user device 100 and another user device 105 having a user account, such as "Telo", 301 may participate in a chatroom 300 created through the instant messaging application managed by the messaging management server 110. Here, when the user device 100 and another user device 105 participate in the chatroom 300, the chatroom 300 may be activated.

The user device 100 may display an instant message 302 including information related to content input from another user device in the chatroom 300. For example, the user device 100 may display the instant message 302 including link information (for example, https://brunch.co.kr/@bbb/cc) and a thumbnail matched with the link information as indirect information about the content.

Figure 3B:
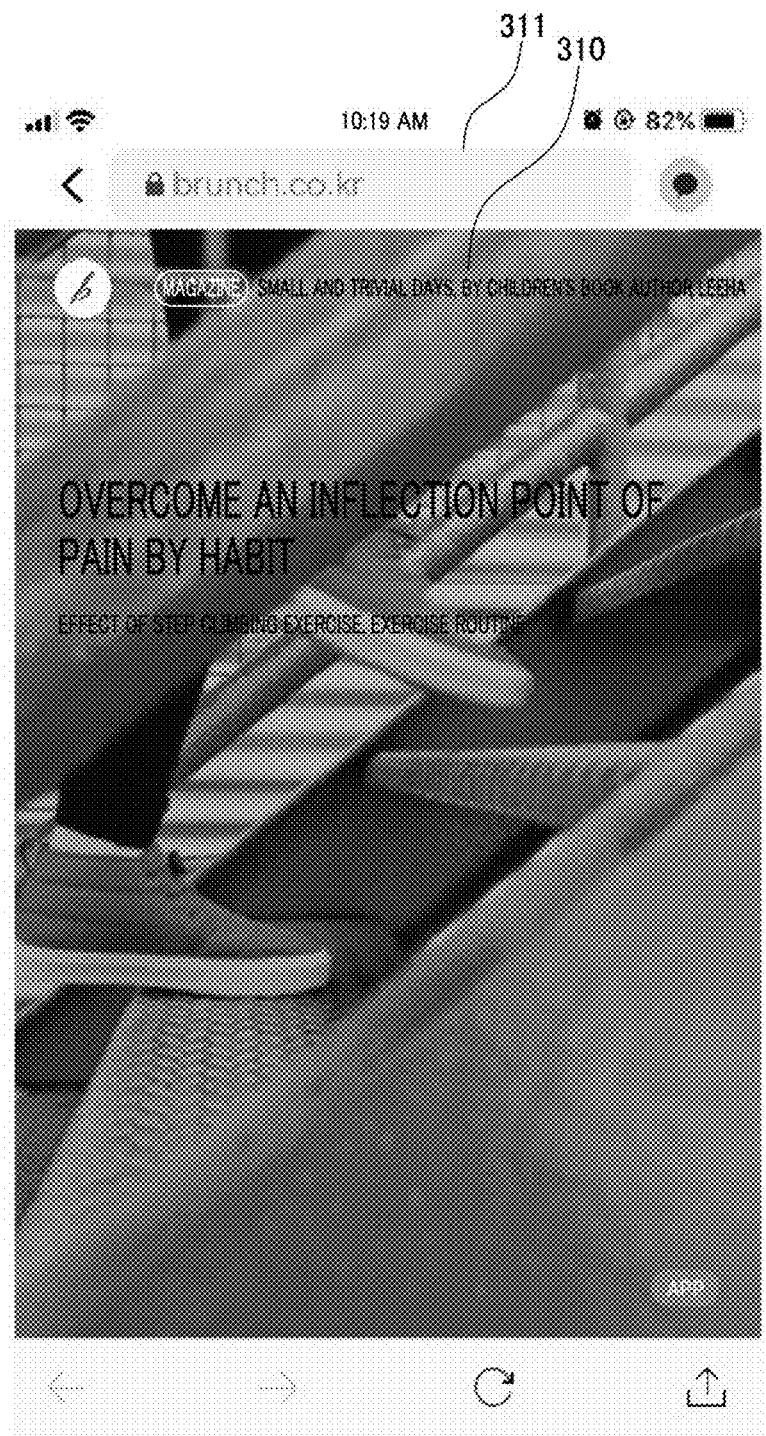
FIG. 3B is example diagram provided to explain a process for providing recommended content related to content on a specific topic in a user device in accordance with various embodiments described herein.

Referring to FIG. 3B, when the user device 100 receives an action of interest, such as a touch input, for the related information of the displayed instant message, the user device 100 may display content 310 corresponding to a web page 311 through a page view. For example, when the user device 100 receives an action of interest in the related information, the user device may display the content 310 on a topic "Overcome an inflection point of pain by habit".

Here, the user device 100 may inactivate the chatroom 300 in which the user device 100 and another user device 105 participate to display the content, and activate an external output, such as a page view or a browser, to display the content.

Figure 3C:
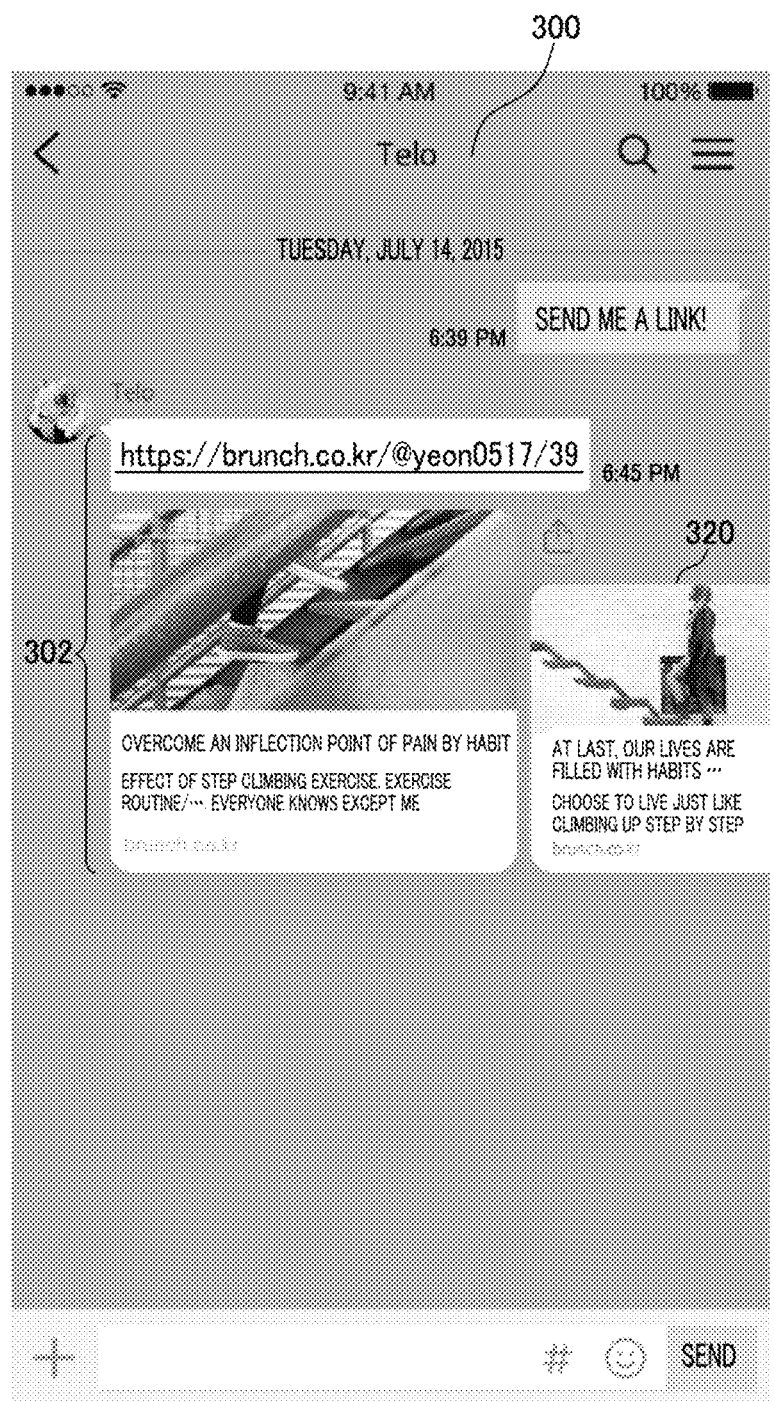
FIG. 3C is example diagram provided to explain a process for providing recommended content related to content on a specific topic in a user device in accordance with various embodiments described herein.

Referring to FIG. 3C, when the user device 100 returns to the chatroom 300 from the content 310, the user device 100 may inactivate the external output and reactivate the chatroom 300.

The user device 100 may display recommended content 320 related to the content together with an animation on the chatroom 300. For example, the user device 100 may display the recommended content 320 related to the content together with an animation.

The user device 100 may display the instant message 302 including the information related to the content and the recommended content 320 to be distinguished from each other in at least one of size, color, location of exposure in the chatroom 300.

For example, the user device 100 may display the recommended content 320 in an empty space beside the instant message 302 including the information related to the content, or display the recommended content 320 at an upper side of the instant message 302, or may display the recommended content 320 at a lower side of the instant message 302.

As another example, the user device 100 may display the recommended content 320 to be larger than the instant message 302 including the information related to the content, or display the recommended content 320 to be smaller than the instant message 302, or display the recommended content 320 to be equal in size to the instant message 302.

As yet another example, the user device 100 may display a speech bubble corresponding to the instant message 302 including the information related to the content and a speech bubble corresponding to the recommended content 320 to be different from each other in background color, outline design, font design, font size and the like.

Figure 3D:
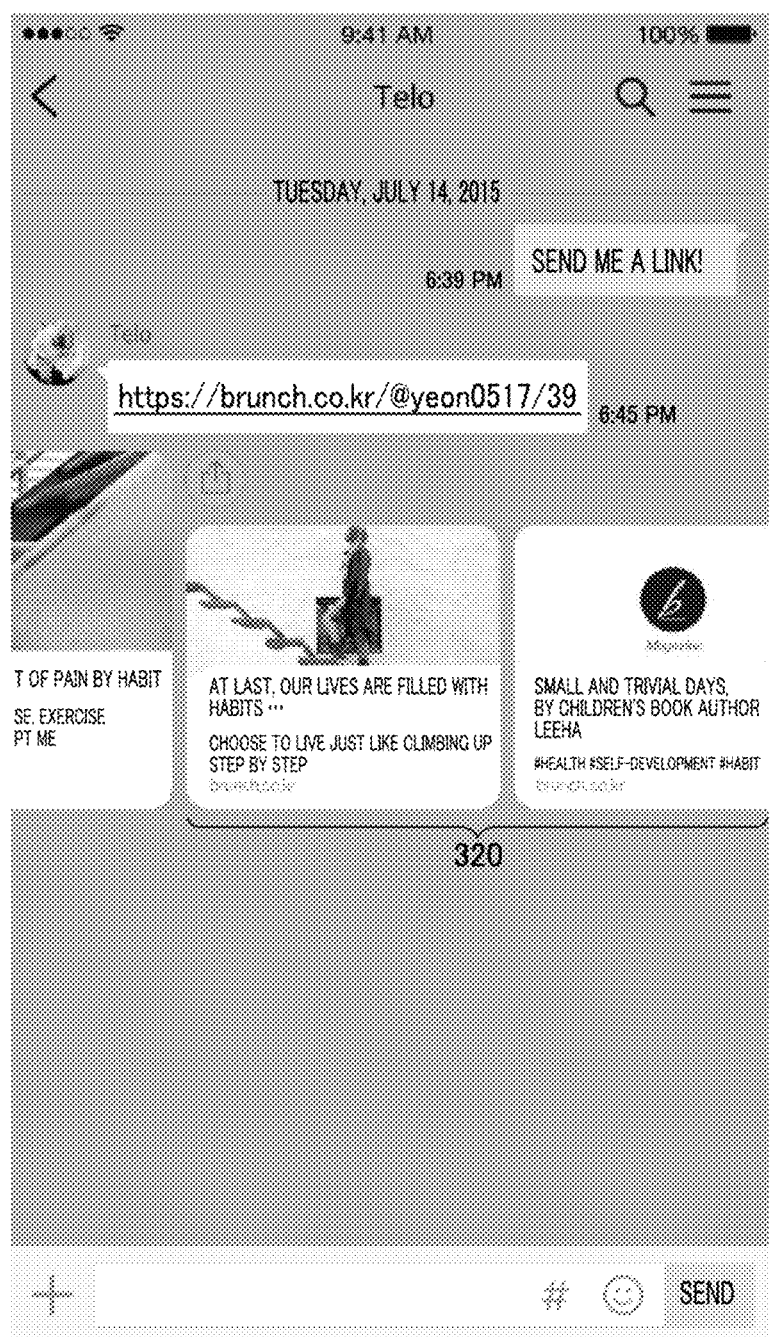
FIG. 3D is example diagram provided to explain a process for providing recommended content related to content on a specific topic in a user device in accordance with various embodiments described herein.

Referring to FIG. 3D, if there is a plurality of recommended content items 320, the user device 100 may select any one of the plurality of recommended content items 320 by a swipe input. For example, the user device 100 may display, as the recommended content 320, "At last, our lives are filled with habits . . . ", "Small and trivial days, by children's book author . . . " and the like related to a topic "habit" extracted from the content 310 "Overcome an inflection point of pain by habit".

As such, according to the present disclosure, if content in which the user's interest has been recognized is a post on the topic "Overcome an inflection point of pain by habit", other posts entitled "At last, our lives are filled with habits . . . ", "Small and trivial days, by children's book author . . . " and the like related to "habit", which is a keyword of the post, may be recommended as recommended content. As another example, if content in which the user's interest has been recognized is a "mini fan", other similar products related to the mini fan (for example, a bladeless fan and the like) may be recommended as recommended content, and if content in which the user's interest has been recognized is a "specific place", other places related to the specific place (for example, a place near the specific place, a place similar in atmosphere to the specific place and the like) may be recommended as recommended content, and if content in which the user's interest has been recognized is a "specific object" (for example, jjajangmyeon), information collected in relation to the specific object (for example, restaurants famous with jjajangmyeon, recipes of jjajangmyeon, news about jjajangmyeon and the like) may be recommended as recommended content.

Figure 4A:
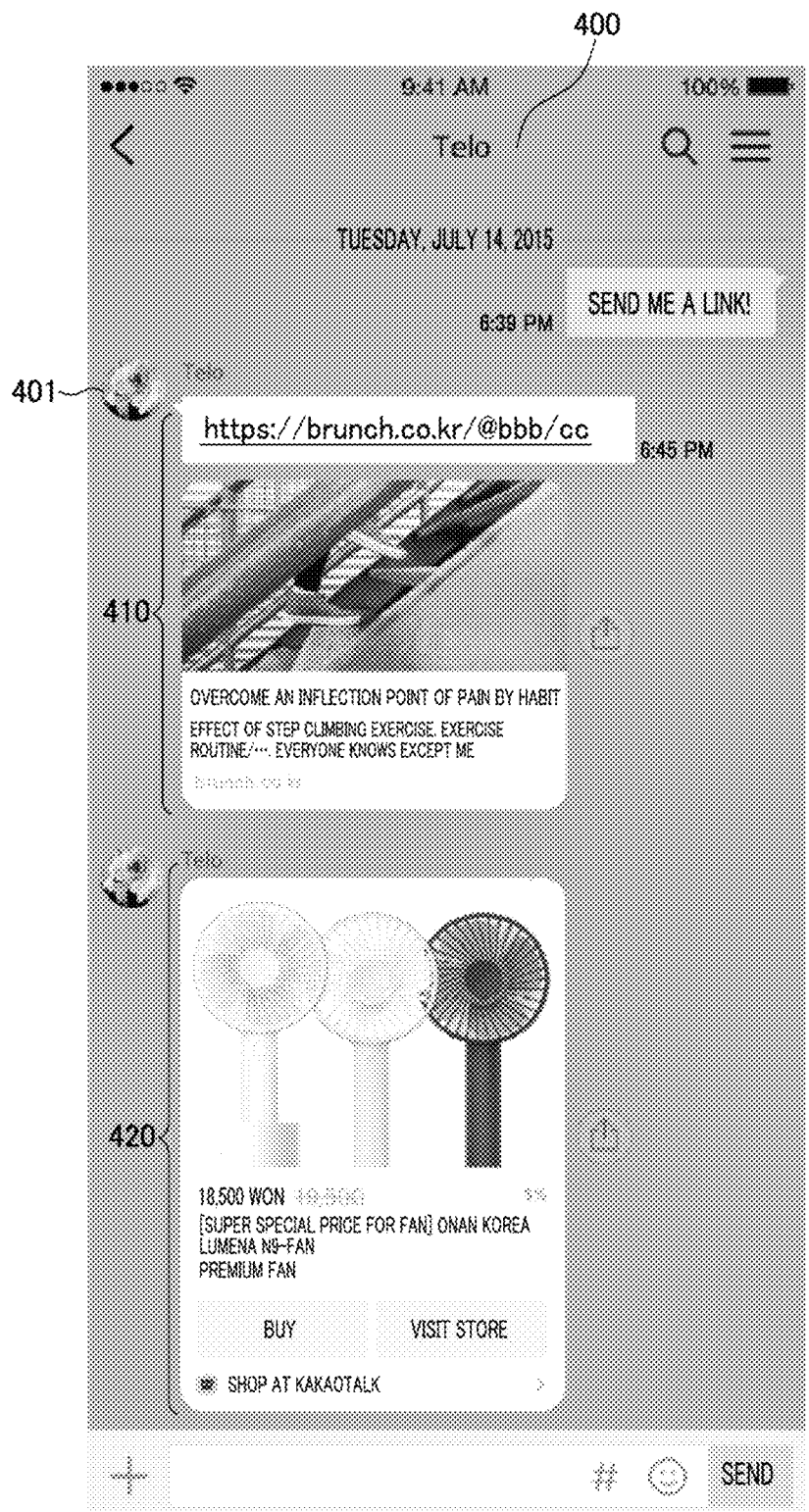
FIG. 4A is example diagram provided to explain a process for displaying content in a user device depending on whether or not an action of interest in related information is input in accordance with various embodiments described herein.
Figure 4B:
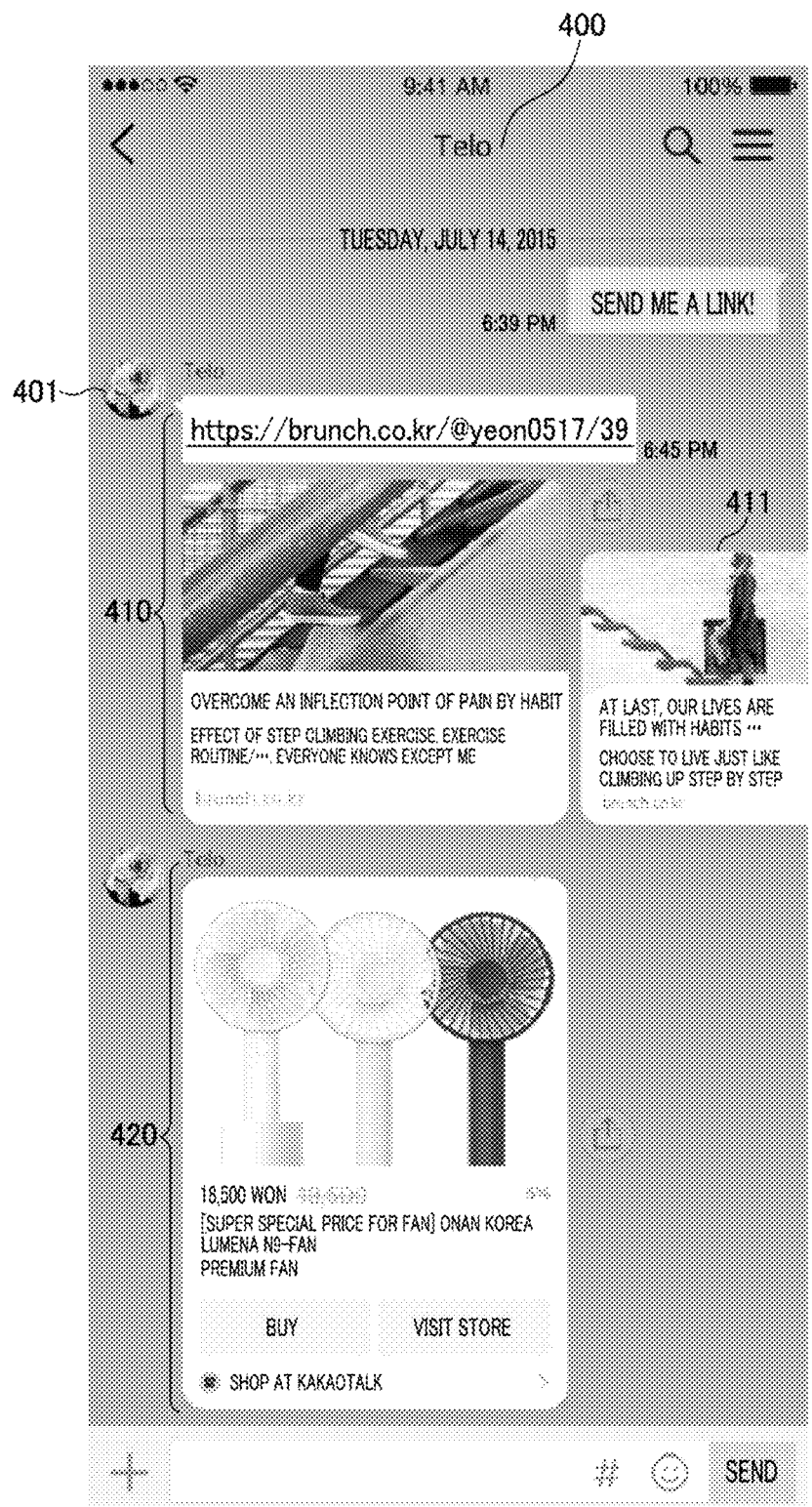
FIG. 4B is example diagram provided to explain a process for displaying content in a user device depending on whether or not an action of interest in related information is input in accordance with various embodiments described herein.

FIG. 4A and FIG. 4B are example diagrams provided to explain a process for displaying content in a user device depending on whether or not an action of interest in related information is input in accordance with various embodiments described herein.

Referring to FIG. 4A, the user device 100 may display an instant message including information related to content input from another user device 401 in a chatroom 400.

For example, the user device 100 may display an instant message 410 including first related information of first content and an instant message 420 including second related information of second content. Here, as the related information of the first content or the second content, link information of the content or summary information matched with the link information may be displayed through the instant message 410 or 420. In this case, the user device 100 may be regarded as being able to receive an action of interest in each of the instant messages 410 and 420.

Referring to FIG. 4B, the user device 100 may display recommended content based on an action of interest in the content when returning back to the chat room from the content.

For example, the user device 100 may display the first content corresponding to the first related information in which an action of interest has been received and then return to the chatroom 400 from the first content displayed on the user device 100. Here, if the user device 100 moves to the first content by the action of interest and then returns to the chatroom 400, the user device 100 may further display, on the chatroom 400, a recommended content 411 related to the first content while the instant message 410 including the first related information in which the action of interest has been received is being displayed.

This is to enable the user to check content corresponding to the user's interest without a separate search by providing the recommended content 411 related to the first content because the first content is regarded as having a high level of the user's interest based on the user's action of interest.

Meanwhile, the user device 100 may maintain a display state of the instant message 420 including the second related information in which the action of interest has not been received. The second content in which the user's action of interest has not been received is regarded as having a low level of the user's interest. Therefore, the second content is not regarded as corresponding to the user's interest, and any recommended content related to the second content may not be displayed.

As such, according to the present disclosure, information related to content in which an action of interest has been received may be output to be distinguished from information related to content in which the action of interest has not been received. By displaying information related to content to be distinguished depending on whether or not an action of interest has been received, it is possible to provide a UI/UX that enables the user to gradually expand interest in content in which the user shows interest.

Figure 5:
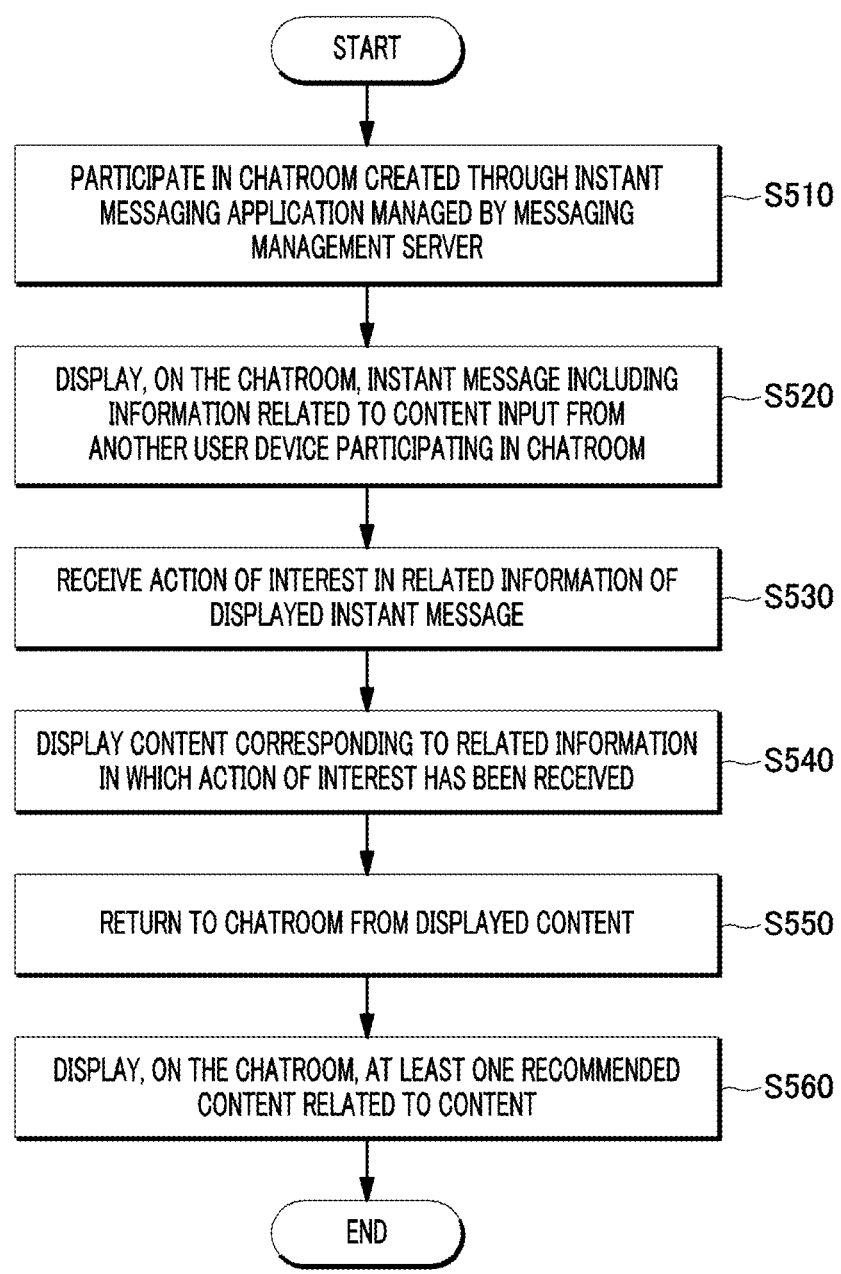
FIG. 5 is a flowchart of a method for providing recommended content related to content in a user device in accordance with various embodiments described herein.

FIG. 5 is a flowchart of a method for providing recommended content related to content in a user device in accordance with various embodiments described herein. The method for providing recommended content related to content in the user device illustrated in FIG. 5 includes the processes time-sequentially performed by the recommended content providing system 1 according to the embodiment illustrated in FIG. 1 to FIG. 4D. Therefore, the above descriptions of the processes may also be applied to the method for providing recommended content related to content by the user device 100 according to the embodiment illustrated in FIG. 1 to FIG. 4D, even though they are omitted hereinafter.

In a process S510, the user device 100 may participate in a chatroom created through the instant messaging application managed by the messaging management server 110.

In a process S520, the user device 100 may display, on the chatroom, an instant message including information related to a content input from another user device 105 participating in the chatroom.

In a process S530, the user device 100 may receive an action of interest in the related information of the displayed instant message.

In a process S540, the user device 100 may display the content corresponding to the related information in which the action of interest has been received.

In a process S550, the user device 100 may return to the chatroom from the displayed content.

In a process S560, the user device 100 may display, on the chatroom, at least one recommended content related to the content.

In the descriptions above, the processes S510 to S560 may be divided into additional processes or combined into fewer processes depending on an exemplary embodiment. In addition, some of the processes may be omitted and the sequence of the processes may be changed if necessary.

Figure 6:
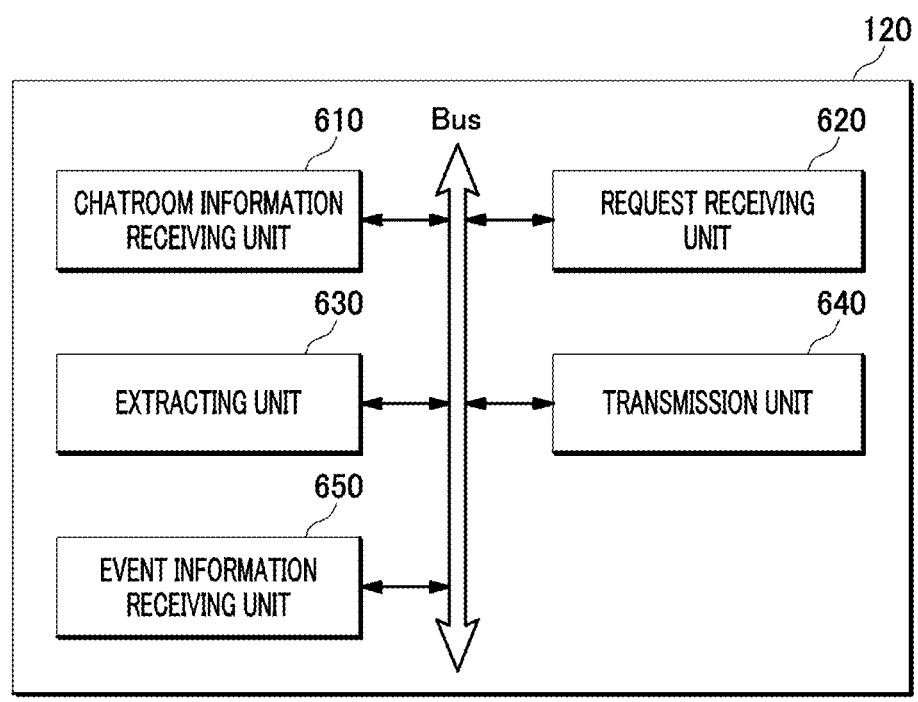
FIG. 6 is a configuration diagram of a content providing server in accordance with various embodiments described herein.

FIG. 6 is a configuration diagram of a content providing server in accordance with various embodiments described herein. Referring to FIG. 6, the content providing server 120 may include a chatroom information receiving unit 610, a request receiving unit 620, an extracting unit 630, a transmission unit 640 and an event information receiving unit 650.

The chatroom information receiving unit 610 may receive information on a chatroom created through the instant messaging application from the messaging management server 110 that manages the instant messaging application. For example, the information about the chatroom may include at least one of user accounts of the user device 100 and another user device 105, respectively, a chatroom identifier of the instant messaging application or a chat history accumulated with conversations between the users in the chatroom.

When an instant message including information related to content input from another user device 105 is displayed through the chatroom and an action of interest in the related information of the displayed instant message is received from the user device 100, the request receiving unit 620 may receive, from the user device 100 or the messaging management server 110, a request for the content.

The extracting unit 630 may extract the content corresponding to the information related to the content based on the request. For example, if the related information includes link information, the extracting unit 630 may extract a web page corresponding to the link information as content.

The transmission unit 640 may transmit the extracted content to the messaging management server 110. For example, when the user device 100 accesses the web page corresponding to the link information for which a touch input has been received, the transmission unit 640 may transmit content corresponding to the web page to the user device 100.

When the user device 100 returns to the chatroom from the content displayed on the user device 100, the event information receiving unit 650 may receive return event information from the messaging management server 110.

The extracting unit 630 may extract recommended content including at least one of content related to attributes of the related information, content recommended based on substance or metadata of the related information, content recommended based on a message displayed on the chatroom before or after the instant message including the related information is received, and content recommended based on data stored in the instant messaging application or the messaging management server 110. Here, the extracting unit 630 may extract the recommended content based on a predetermined number of recommended content. The recommended content may be extracted through a filter for previously set for a specific topic or a specific content source.

When the return event information is received, the extracting unit 630 may extract recommended content related to the content based on the received return event information, or may extract recommended content related to the content even if the return event information is not received.

For example, before the user device 100 receives related information (for example, link information of famous and tasty restaurants) input from the other user device 105, if the extracting unit 630 the user device 100 has a conversation about "famous and tasty restaurants in Yeoido" with the other user device 105, the extracting unit 630 may extract recommend content related to the famous and tasty restaurants in Yeoido.

When the action of interest in the related information is received again through the user device 100, the extracting unit 630 may re-extract recommended content related to the content based on the related information in which the action of interest has been received again.

The transmission unit 640 may transmit the extracted recommended content to the messaging management server 110. For example, the transmission unit 640 may transmit the extracted recommended content to the messaging management server 110 after the return event information is received, or may transmit the recommended content to the user device 100 together with the content even if the return event information is not received.

FIG. 7 is a flowchart of a method for providing recommended content related to content in a content providing server in accordance with various embodiments described herein. The method for providing recommended content related to content in the content providing server 120 illustrated in FIG. 7 includes the processes time-sequentially performed by the recommended content providing system 1 according to the embodiment illustrated in FIG. 1 to FIG. 6. Therefore, the above descriptions of the processes may also be applied to the method for providing recommended content by the content providing server 120 according to the embodiment illustrated in FIG. 1 to FIG. 6, even though they are omitted hereinafter.

In a process S710, the content providing server 120 may receive information on a chat room created through the instant messaging application from the messaging management server 110 that manages the instant messaging application.

In a process S720, the content providing server 120 may receive, from the user device 100 or the messaging management server 110, a request for a content corresponding to information related to the content input from another user device 105 when an action of interest in information related to content of an instant message displayed on the chatroom is received from the user device 100.

In a process S730, the content providing server 120 may extract the content corresponding to the related information based on the request.

In a process S740, the content providing server 120 may transmit the extracted content to the messaging management server 110.

In a process S750, the content providing server 120 may extract at least one recommended content related to the content. For example, when the user device 100 returns to the chatroom from the content displayed on the user device 100, the content providing server 120 may receive return event information from the messaging management server 110 and extract recommended content related to the content based on the received return event information, or may extract recommended content related to the content without receiving the return event information.

In a process S760, the content providing server 120 may transmit the extracted at least one recommended content to the messaging management server 110.

In the descriptions above, the processes S710 to S760 may be divided into additional processes or combined into fewer processes depending on an embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method performed by a user device, comprising:
  entering into a chatroom created through an instant messaging application managed by a messaging management server;
  displaying, in the chatroom, an instant message including information related to a content input from a user account of another user device that entered into the chatroom;
  receiving an action of interest in the related information of the displayed instant message;
  opening a page external to the chatroom to view the content corresponding to the related information in which the action of interest has been received;
  closing the content on the page external to the chatroom to return to the chatroom from the displayed content; and
  displaying, in the chatroom, at least one recommended content related to the content that received the action of interest.

2. The method of claim 1,
  wherein the related information on the content includes link information of the content, and
  wherein the receiving of the action of interest includes receiving a touch input for the link information.

3. The method of claim 2, wherein the displaying of the content includes:
  accessing a web page corresponding to the link information for which the touch input has been received; and
  displaying the content corresponding to the web page through a page view of the instant messaging application, and
  wherein the returning to the chatroom includes closing the page view.

4. The method of claim 1, wherein the at least one recommended content includes at least one of:
  a content related to attributes of the related information;
  a content recommended based on substance or metadata of the related information,
  a content recommended based on a message displayed in the chatroom before or after the instant message including the related information is received; and
  a content recommended based on data stored in the instant messaging application.

5. The method of claim 2, further comprising:
  displaying, in the chatroom, summary information matched with the link information.

6. The method of claim 3, wherein the displaying of the at least one recommended content includes:
  receiving the at least one recommended content related to the content from a content providing server; and
  displaying, in the chatroom, the at least one recommended content to be distinguished from the instant message including the information related to the content.

7. The method of claim 6, wherein the displaying of the at least one recommended content includes:
  displaying each of the at least one recommended content by using summary information matched with the link information related to an external source for each of the at least one recommended content.

8. The method of claim 7, further comprising:
  selecting any one of the at least one recommended content displayed in a form of a slide by a swipe input; and
  accessing a web page corresponding to the selected recommended content.

9. The method of claim 6, further comprising:
  displaying, in the chatroom, an instant message including first related information on a first content and an instant message including second related information on a second content;
  receiving an action of interest in the first related information;
  opening a page external to the chatroom to view the first content corresponding to the first related information in which the action of interest has been received;
  closing the first content of the page external to the chatroom to return to the chatroom from the displayed first content;
  further displaying, in the chatroom, a recommended content related to the first content while the instant message including the first related information in which the action of interest has been received is being displayed; and
  maintaining the displayed instant message including the second related information in which the action of interest has not been received.

10. The method of claim 1, further comprising:
  receiving again the action of interest in the related information; and
  refreshing the at least one recommended content related to the content based on the related information in which the action of interest has been received again.

11. A user device comprising:
  a participation unit configured to enter into a chatroom created through an instant messaging application managed by a messaging management server;
  a receiving unit configured to receive, from the messaging management server, an instant message including information related to a content input from a user amount of another user device that entered into the chatroom;
  a display unit configured to display the instant message received in the chatroom; and an input unit configured to receive an action of interest in the related information of the displayed instant message, wherein the receiving unit is further configured to receive, from a content providing server, the content corresponding to the related information in which the action of interests has been received, the user device is configured to open a page external to the chatroom so that, the display unit displays the received content, the receiving unit receives at least one recommended content related to the content from the content providing server, and when the user device closes the content on the page external to the chatroom to return to the chatroom from the displayed content, the display unit displays, in the chatroom, the at least one recommended content related to the content that received the action of interest.

12. A content providing server comprising:

a chatroom information receiving unit configured to receive information in a chatroom created through an instant messaging application from a messaging management server that manages the instant messaging application;

a request receiving unit configured to receive, from the messaging management server, a request for a content corresponding to information related to the content input from a user account of another user device when an instant message including the related information is displayed in the chatroom and an action of interest in the related information of the displayed instant message is received from a user device;

an extracting unit configured to extract the content corresponding to the related information based on the request; and a transmission unit configured to transmit the extracted content to the messaging management server when the user device accesses the extracted content for viewing the extracted content on a page external to the chatroom, wherein the extracting unit is further configured to extract at least one recommended content related to the content that received the action of interest, and the transmission unit is further configured to transmit the extracted at least one recommended content to the messaging management server when the user device returns to the chatroom by closing the extracted content on the page external to the chatroom.

13. The content providing server of claim 12, wherein the transmission unit is further configured to transmit the at least one recommended content to the messaging management server together with the content.

14. The content providing server of claim 12, further comprising:

an event information receiving unit configured to receive return event information from the messaging management server when the user device returns to the chatroom from the content displayed on the user device, wherein the extracting unit is further configured to extract the at least one recommended content related to the content based on the received return event information, the transmission unit is further configured to transmit the extracted at least one recommended content to the messaging management server.

15. The content providing server of claim 12, wherein the information related to the content includes link information of the content, and the action of interest in the related information includes a touch input for the link information.

16. The content providing server of claim 15, wherein when the user device accesses a web page corresponding to the link information for which the touch input has been received, the transmission unit is further configured to transmit the content corresponding to the web page to the user device.

17. The content providing server of claim 12, wherein when the action of interest in the related information is received again through the user device, the extracting unit is further configured to re-extract at least one recommended content related to the content based on the related information in which the action of interest has been received again, and the transmission unit is further configured to transmit the re-extracted at least one recommended content to the messaging management server.

* * * * *